April 29, 1958 W. TOEPEL 2,832,313
APPARATUS TO HOLD ANIMALS FOR SURGERY AND THE LIKE
Filed Dec. 12, 1956 4 Sheets-Sheet 1

INVENTOR
Wolfgang Toepel

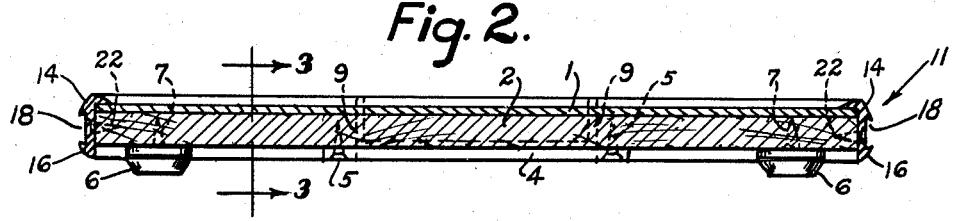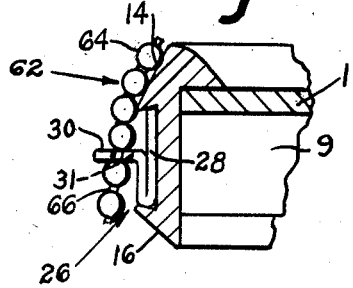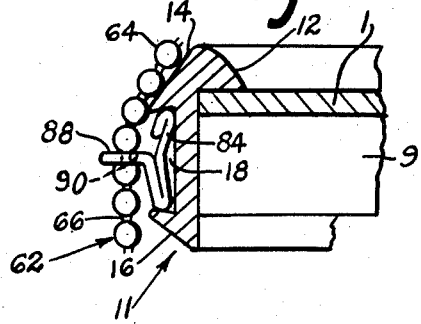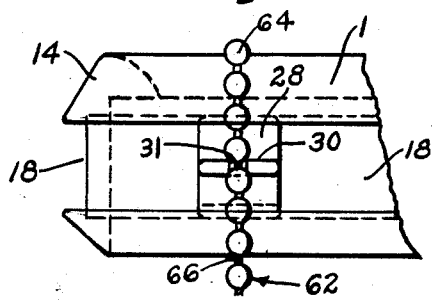

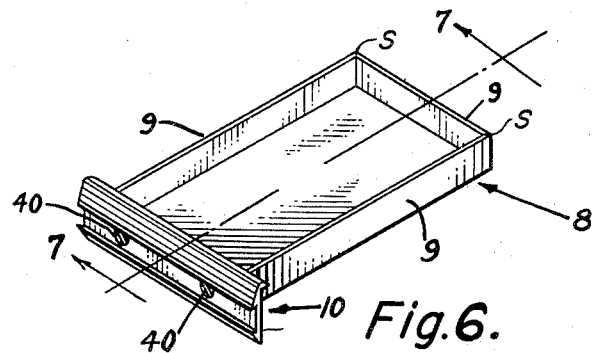
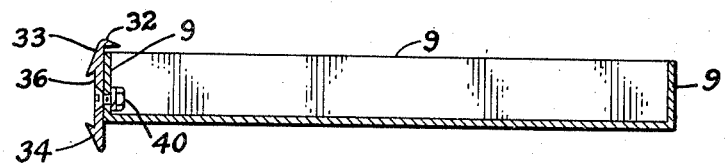
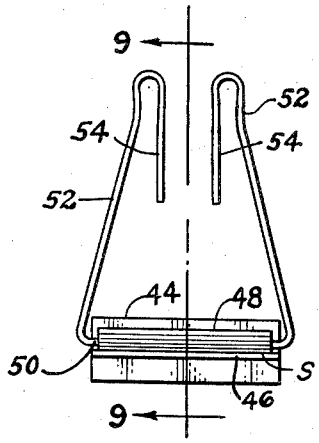
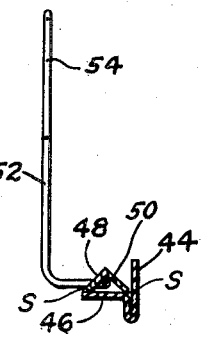
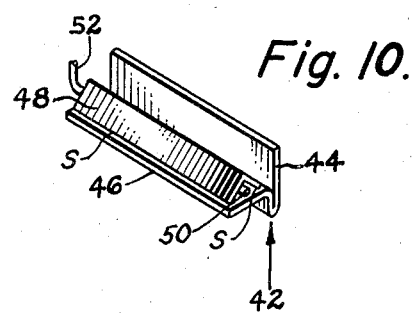

INVENTOR
Wolfgang Toepel es Patent Office 2,832,313
Patented Apr. 29, 1958

2,832,313

APPARATUS TO HOLD ANIMALS FOR SURGERY AND THE LIKE

Wolfgang Toepel, Brookline, Mass.

Application December 12, 1956, Serial No. 627,781

6 Claims. (Cl. 119—103)

This invention relates to apparatus to hold animals while they are being operated upon or otherwise dealt with, and particularly to such apparatus for small animals such as the guinea pig, rat and hamster, which are constantly used in the work of hospitals, research laboratories, and biology departments of educational institutions.

One object of my invention is to provide apparatus to suitably support the animal, with holders that can be moved to any desired position to thus better hold the animal in the desired position as well as firmly hold him.

Since the operations performed are often delicate, it is often important to frequently change the position of the animal, to do the best work, and to be able to do this quickly with a minimum movement by the operator. Accordingly, another object of my invention is to provide retainer mechanism that enables the holders to be instantly moved by a sliding movement of the retainers, to any desired position, and put under any desired tension.

A further object is to provide such apparatus that can be manufactured at a moderate cost, and that is durable.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Fig. 2 is an enlarged sectional view taken on the line 2—2 of Fig. 1.

Fig. 3 is a fragmentary, enlarged, sectional view taken on the line 3—3 of Fig. 2.

Fig. 4 is a sectional view similar to Fig. 3, showing a modification of retainer.

Fig. 5 is an enlarged, fragmentary, side elevational view of my apparatus.

Fig. 6 is a perspective view of a drawer that is part of my apparatus.

Fig. 7 is an enlarged, sectional view taken on the line 7—7 of Fig. 6.

Fig. 8 is a top plan view of a retainer, with holder, that is used with said drawer.

Fig. 9 is a sectional view taken on the line 9—9 of Fig. 8.

Fig. 10 is a perspective view of the retainer shown in Figs. 8 and 9, showing parts of the holder broken away.

Figure 1:
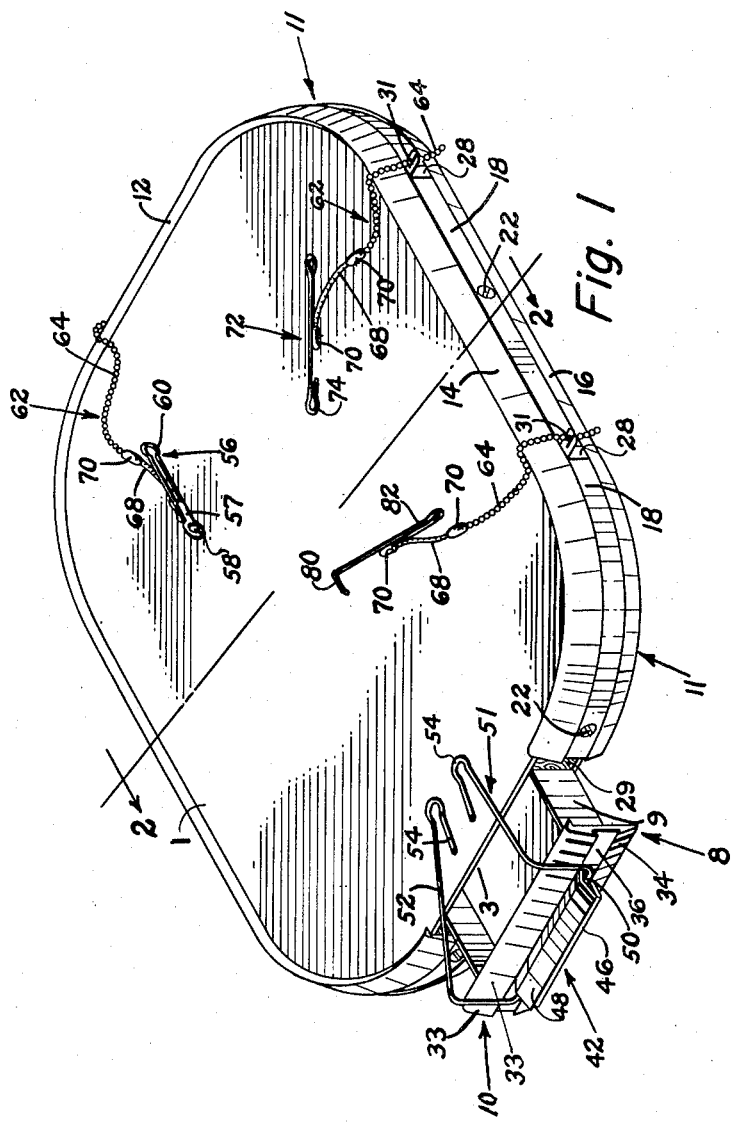
Fig. 1 is a perspective view of my apparatus to hold animals.
Figure 11:
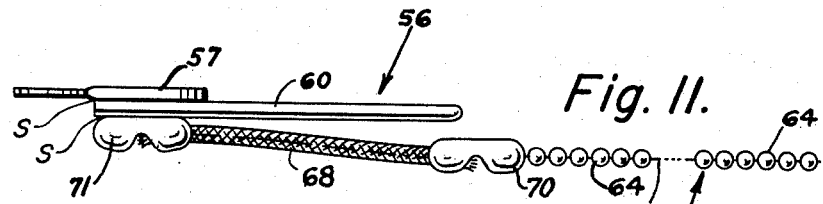
Fig. 11 is a side elevational view of an incisor holder.
Figure 12:
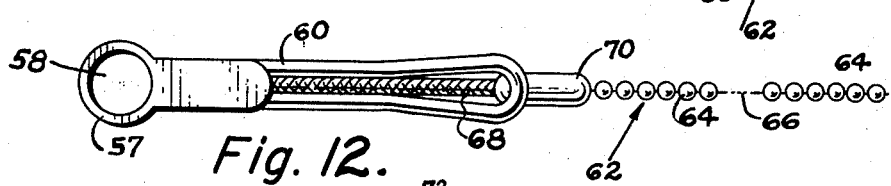
Fig. 12 is a top plan view of said incisor holder.
Figure 13:
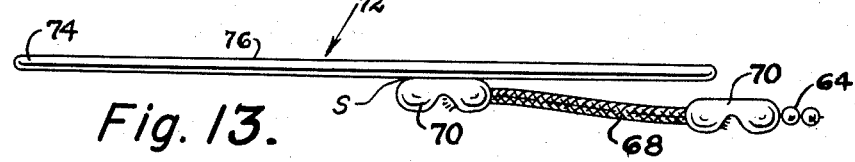
Fig. 13 is a side elevational view of a front leg holder.
Figure 14:
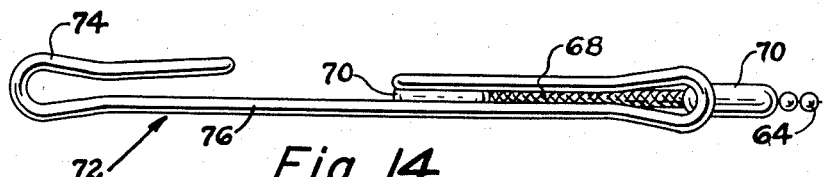
Fig. 14 is a top plan view of the holder shown in Fig. 13.
Figure 15:
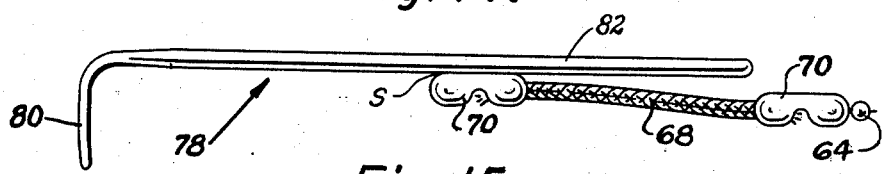
Fig. 15 is a side elevational view of a retractor holder.
Figure 16:
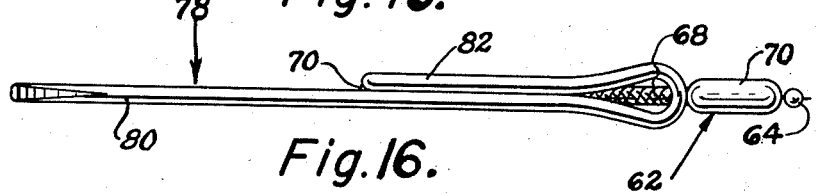
Fig. 16 is a top plan view of said retractor holder.
Figure 17:
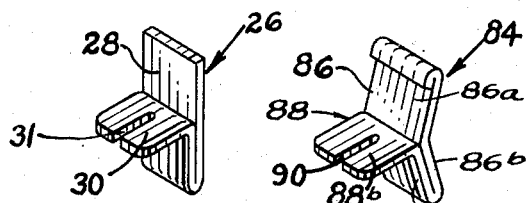
Fig. 17 is a perspective view of a retainer that slides in my retainer track.

As illustrated, my apparatus has a main support having a top, surface plate 1 which may be made of aluminum, a body piece 2 of plywood, cork or the like, covered with plastic lacquer and which has a rectangular cut-out or opening 3 at its front. A rectangular drawer supporting plate 4 is directly below said opening 3, having outer edge portions that are directly under said center body piece 2, to which they are attached by screws 5. Rubber feet 6 are attached to said body piece 2 by screws 7.

Slidable on said plate 4 in said opening 3, is a metal drawer 8 having the usual walls 9 forming the two sides, rear and front thereof, and a retainer track 10, later described, at the front. This drawer 8 is intended to hold articles used in connection with animal-operating work, and is closed when an animal is held in place on my apparatus.

Outside of said main support at the peripheral side thereof is main retainer means shown as a track 11 which surrounds said body piece 2, except adjacent said drawer 8. This main track 11 has an upper, rear projecting portion 12 that rests on said surface plate 1 of the main support. It also has an upper guide portion 14 that projects diagonally outward and downward, and spaced therefrom, it has a lower guide portion 16 projecting diagonally upward and outward. These upper and lower guide portions 14 and 16 provide upper and lower undercut shoulders between which it is a guideway 18 along which retainers 26 slide, which are later described. There are countersunk holes in said guideway 18, through which screws 22 extend into said body piece 2, thus firmly fastening said main track 11 to said main support.

Slidably retained by said main track 11 along said guideway 18, are said retainers 26 which have a back 28 and an attaching portion 30 extending therefrom upwardly and outwardly and which has a retaining slot 31 therein. These retainer backs 28 are inserted between said upper and lower guide portions 14 and 16 respectively at the space 29 between a said drawer side wall 9 and the end of said main track 11, when said drawer is open.

Said retainer track 10, forming the front of said drawer 8, extends laterally beyond said drawer and lines up with said main retainer track 11, thus closing said space 29, when said drawer 8 is closed. This track 10 is formed similarly to said main track 11, as shown in said Fig. 7, with a rear, upper projecting portion 32 that rests on said drawer front wall 9. It also has an outer, upper guide portion 33 extending diagonally downward and outward, and an outer, lower, guide portion 34 extending diagonally outward and upward, similar to those of the main track previously explained. It also has a guideway 36 between said guide portions 32 and 34, which guideway has holes therethrough to receive bolts 40 that extend through holes in said front wall 9 to firmly hold said drawer track 10 to said drawer 8.

Slidable between said guide portions 33 and 34, along said guideway 36, is a retainer 42 which has a back 44 from which an attaching portion 46 extends upwardly and then outwardly. Above and soldered to the latter is an enclosure portion 48 having two portions extending diagonally towards and joining each other.

An anchoring portion 50 of a wire, double holder 51 is enclosed within said retainer 42, and two arms 52 extend from opposite ends thereof, terminating at their outside ends in hooked portions 54 that are intended to hold the legs of an animal to be operated upon. This double holder may have one hook portion 54 unbent until it is inserted through said enclosure portion 48. Said retainer 42 is slidable in said retainer track 10, since said guideway 36 is longer than said retainer 42.

In order to hold the head of an animal I provide an incisor holder 56 having an outer end 57 with a hole 58 therein, through which hole the incisor teeth of the animal extends, when in use. A looped handle member 60 is fastened to said outer end 57, as by soldering S.

An elongate, flexible fastener 62 is attached to said incisor attaching member 56, and it is adapted to enter and be retained in said slot 31 in said retainer 26. For greater effectiveness of said elongate fastener 62 a portion of it consists of ball members 64 through which a wire or cord 66 extends in the usual way. An elastic braid 68 is connected to said ball member portion by a well known hollow connector 70 by forming a knot at one end, and this braid 68 is also connected to said handle 60 by another said connector 71 by forming a knot at the opposite end of said braid. Said latter connector 71 is soldered as at S, to said handle 60.

Another holder 72 is intended to hold the front legs of the animal. It has a hook portion 74 formed at one end, and a handle portion 76 extending therefrom to which a said elongate fastener 62 is attached by soldering thereto, as at S, to a said hollow connector 70.

Two of these attaching members 72 are commonly used, being attached by said retainers 26, at opposite sides of said main support, as above explained.

A retractor holder 78, commonly used in pairs, has an angle portion 80 at one end, from which a looped handle portion 82 extends. A said elongate fastener 62 is attached to said retractor handle 82 by soldering a said hollow connector 70 thereto as at S. A pair of these retractor holders 78 are commonly used to retract or spread opposite parts of the animal's body where the incision is made to thereby provide the necessary opening.

Since it is necessary to firmly hold the animal to be operated upon, said retainer track 11 provides a continuous guideway 18, thus permitting said retainers 26 to be slid, in the finest degree, to whatever position is most suitable to hold the different parts of the animal for the work to be performed. When further tightening, or slackening is desired, it often can instantly be effected in some degree by merely sliding a said retainer 26 along said guideway 18 without removing a holder from a retainer slot 31.

Of course, said elongate fasteners 62 are usually placed under some tension when they are placed in said retainer slots 32, with the elasticity of said braid 68 contributing to the tension. However, the position of a leg or other part of the animal must sometimes be changed, or an elongate fastener may be in the way of the operator. Merely sliding a said retainer 26 to the desired point often is sufficient to effect the change in position or vary the tension, as desired.

Figure 18:
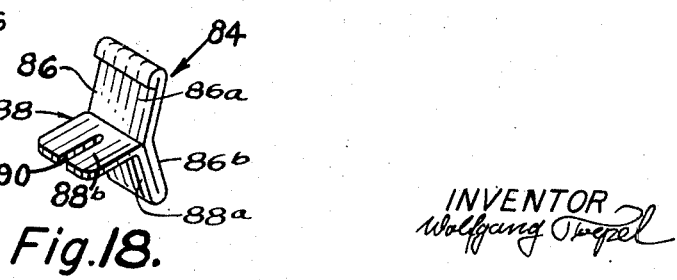
Fig. 18 is a perspective view of a modified form of said retainer.

In Fig. 18 of the drawings, a modified form of retainer 84 is shown, having a back 86, the upper portion 86a of which is looped at the top, and extends therefrom, in position of use, diagonally downward and inward, and the lower portion 86b of which extends diagonally downward and outward. An attaching portion 88 extends from said lower portion 86b diagonally upward and outward, as at 88a, and then laterally outward, as at 88b, the latter portion having a retaining slot 90 therein.

Should said drawer 8 not be desired, for any reason, said main track 11 could extend farther to thus take the place of said drawer track 10, in which event two separate holders, if desired, could take the place of said double holder 51, using said retainers 26 or 36.

What I claim is:

1. An apparatus to hold an animal being operated upon, comprising a main support having a top surface and a peripheral side, a guideway along said peripheral side, said guideway having upper and lower undercut shoulders, at least one retainer slidable in said guideway, and animal securing means operatively attached to said retainer whereby an animal on said top surface of said support may be engaged and held in suitable position for operation.

2. An apparatus as set forth in claim 1 in which said retainer embodies a back having an intermediate portion extending outwardly, and spaced, from said guideway.

3. An apparatus as set forth in claim 1, said main support having an opening therein extending inwardly from said peripheral side and below said top surface, a plate below said opening supported by said main support, a drawer slidable on said plate in said opening, said drawer embodying a guideway embodying two guide members spaced apart, a retainer slidable along said guideway between said guide members, and a holder attached to said latter retainer.

4. An apparatus as set forth in claim 1 in which said retainer embodies an attaching portion extending outwardly having a slot extending from an outer extremity of said attaching portion inwardly and adapted to receive a fastener therein.

5. An apparatus as set forth in claim 1 in which one said shoulder extends diagonally outward.

6. An apparatus as set forth in claim 3 in which said drawer guideway is in alinement with the first-mentioned guideway when said drawer is closed.

References Cited in the file of this patent

UNITED STATES PATENTS

| | | |
|---|---|---|
| 1,650,327 | Conrad | Nov. 22, 1927 |
| 1,980,848 | Cass | Nov. 13, 1934 |
| 2,279,012 | Packchanian | Apr. 7, 1942 |
| 2,647,026 | Shampaine | July 28, 1953 |
| 2,688,289 | Sterling | Sept. 7, 1954 |